Dec. 21, 1948.  B. H. SHORT  2,456,743
HIGH-FREQUENCY IGNITION SYSTEM
Filed July 23, 1945  3 Sheets-Sheet 1

Engine driven shaft drives the ignition timer cam and the variable condenser rotor.

INVENTOR
Brooks H. Short.
BY
his ATTORNEYS

Dec. 21, 1948.    B. H. SHORT    2,456,743
HIGH-FREQUENCY IGNITION SYSTEM
Filed July 23, 1945    3 Sheets-Sheet 2

INVENTOR
Brooks H. Short.
BY
his ATTORNEYS

Dec. 21, 1948.        B. H. SHORT        2,456,743
HIGH-FREQUENCY IGNITION SYSTEM
Filed July 23, 1945        3 Sheets-Sheet 3
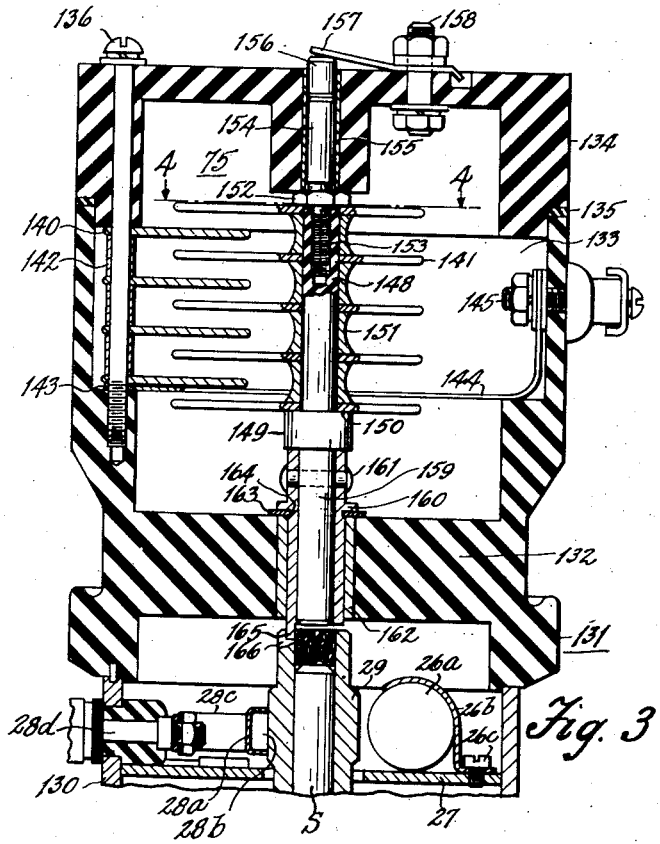
Fig. 3
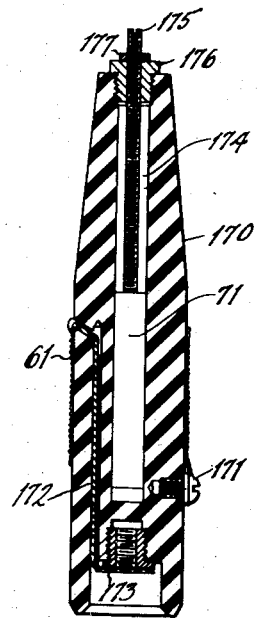
Fig. 6
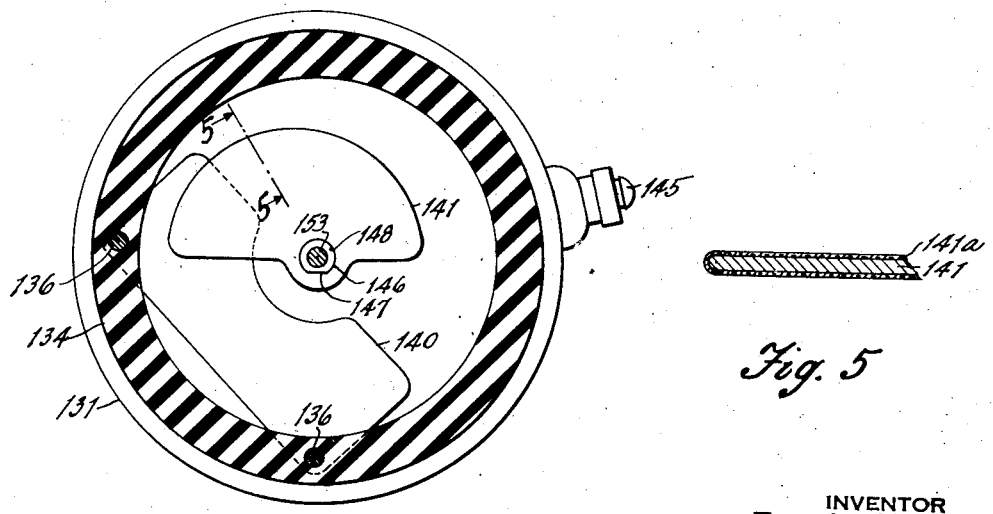
Fig. 4
Fig. 5
INVENTOR
Brooks H. Short
BY
Spencer Hardman & Fehr
his ATTORNEYS Patented Dec. 21, 1948

2,456,743

UNITED STATES PATENT OFFICE 2,456,743

HIGH-FREQUENCY IGNITION SYSTEM

Brooks H. Short, Anderson, Ind., assignor to General Motors Corporation, Detroit, Mich., a corporation of Delaware Application July 23, 1945, Serial No. 606,645

19 Claims. (Cl. 315—210)

This invention relates to a high frequency ignition system for an internal combustion engine.

This application is a continuation in part of my application, Serial No. 530,288, filed April 10, 1944.

The object of the present invention is to provide ignition even though the engine may be operating under high compression and the spark plugs may be fouled. In the disclosed embodiments of this invention, this object is accomplished by providing at each spark plug, a resonator, the resonators of the different spark plugs being tuned to different frequencies, an oscillator having a variable condenser which can be adjusted to tune the oscillator successively with the various resonators at the spark plugs, a timer for controlling the operation of the oscillator and mechanically connected with its variable condenser whereby ignition is provided at the engine spark plugs in recurrent sequence.

Further objects and advantages of the present invention will be apparent from the following description, reference being had to the accompanying drawings, wherein preferred embodiments of the present invention are clearly shown.

In the drawings:

Fig. 3 is a longitudinal, sectional view of the ignition timer and the variable condenser of the oscillator.

Fig. 4 is a sectional view on line 4—4 of Fig. 3.

Fig. 5 is an enlarged fragmentary, sectional view on an enlarged scale on line 5—5 of Fig. 4.

Fig. 6 is a longitudinal, sectional view of a part of one of the resonators associated with a spark plug.

Figure 1:
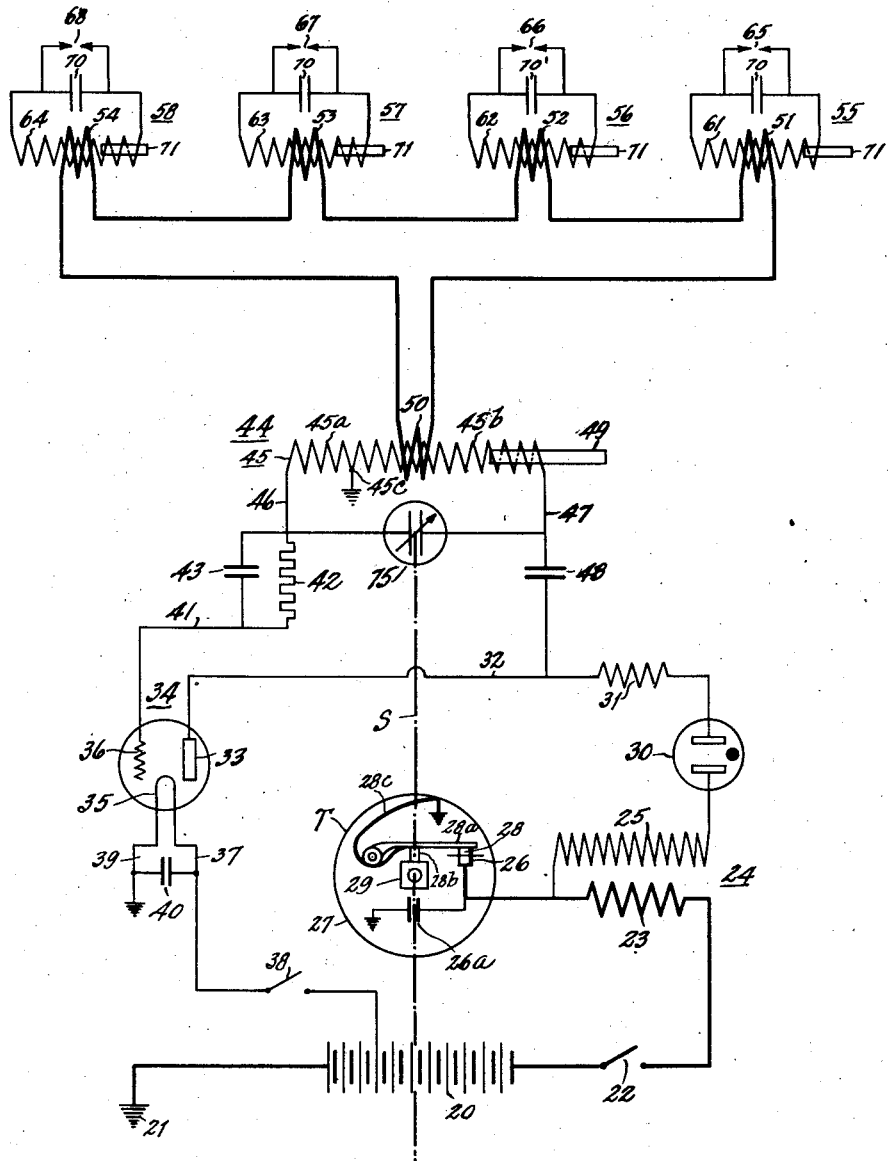
Fig. 1 is a wiring diagram of one embodiment of the present invention in which the operation of the oscillator is effected by the voltage obtained from an induction coil.

Referring to Fig. 1, 20 designates a battery, preferably 24 volts, one terminal of which is grounded at 21. The other terminal of the battery is connected through a switch 22 with one terminal of a primary winding 23 of an induction coil 24 having a secondary winding 25 connected to the other primary terminal which is connected also to a fixed contact 26 insulatingly supported on a stationary plate 27 of a timer T. The fixed contact 26 cooperates with a movable contact 28 carried by a lever 28a connected by spring blade 28c with ground. Spring blade 28c urges the rubber block 28b mounted on lever 28a toward a timer cam 29 driven by shaft S indicated by the vertical dot-dash line. The contacts 26 and 28 are shunted by a condenser 26a which reduces sparking at the contacts.

The induction coil secondary 25 is connected with a cold cathode diode 30, a high frequency choke 31, wire 32 and plate 33 of a thermionic tube 34. The tube 34 is also provided with a cathode 35 and a grid 36. The cathode 35 is connected at one end by a lead 37 which is in turn connected with the battery 20 through a switch 38. Thus, when the switch 38 is closed, the cathode will be heated. A condenser 40 is connected across the cathode leads 37 and 39. The grid 36 is connected by a wire 41 to a grid resistance 42 and a condenser 43 which are connected by wire 46 to one end of a primary 45 of an oscillator coil 44. Primary 45 has sections 45a and 45b connected with ground tap 45c. The other end of primary 45 is connected by a wire 47 with a condenser 48 which is connected with wire 32. An adjustable core 49 extends within the primary coil 45.

Associated with the primary is a secondary winding 50 of a few turns in which is induced a high frequency current of low voltage and high amperage. The secondary 50 is connected in series with primary coils 51, 52, 53 and 54 of resonators 55, 56, 57 and 58 respectively, having secondary windings 61, 62, 63 and 64 respectively, connected with the spark gaps of spark plugs 65, 66, 67 and 68 respectively, and each with a condenser 70. The natural frequencies of the resonators are substantially different and are determined by iron rods 71 which can be so adjusted as to project different distances within the secondary windings of the resonators.

The frequency of the oscillatory current in coil 44 is determined by a variable condenser 75 connected to wires 46 and 47.

The operation of the system is as follows: When the switches 22 and 38 are closed a primary circuit is completed including the storage battery 20, ignition switch 22, the contacts 26, 28 of the engine driven ignition timer and the primary of the induction coil 24 designed to give the required secondary voltage when the contacts 26, 28 of the ignition timer separate through the cold cathode diode 30 which prevents discharge of the secondary until a secondary voltage has been reached which is effective so to operate the circuit that ignition will be provided by a fouled spark plug. This avoids draining off energy due to leakage at the plug when the secondary voltage is rising. When this voltage is applied to the plate 33 of the thermionic tube 34, the tube becomes conducting and, as will be explained in detail later, high frequency oscillations are produced in the oscillator primary coil 45. In the secondary 50 of relatively few turns, there is induced a high frequency current of low voltage and high amperage.

The frequency of the oscillator is determined by the adjustment of the movable plates of the condenser 75 which are connected in a manner to be described with the ignition timer cam 29. When the time arrives for the firing of a certain engine cylinder, the timer contacts separate; and, at that instant, the movable plates of the variable condenser 75 are so positioned that the oscillator 44 is tuned only to the resonator associated with that spark plug which is in the cylinder to be fired. For that reason, a spark of high voltage and frequency will occur only at the gap of that spark plug. Sparking does not occur at the other gaps of the resonators not in tune with the oscillator at the time of discharge of coil 24 because the resonator which is in tune with the oscillator receives a very large portion of the total wattage. Hence the resonators of the spark plugs not to be fired receive a voltage too low to jump the spark gap.

Figure 2:
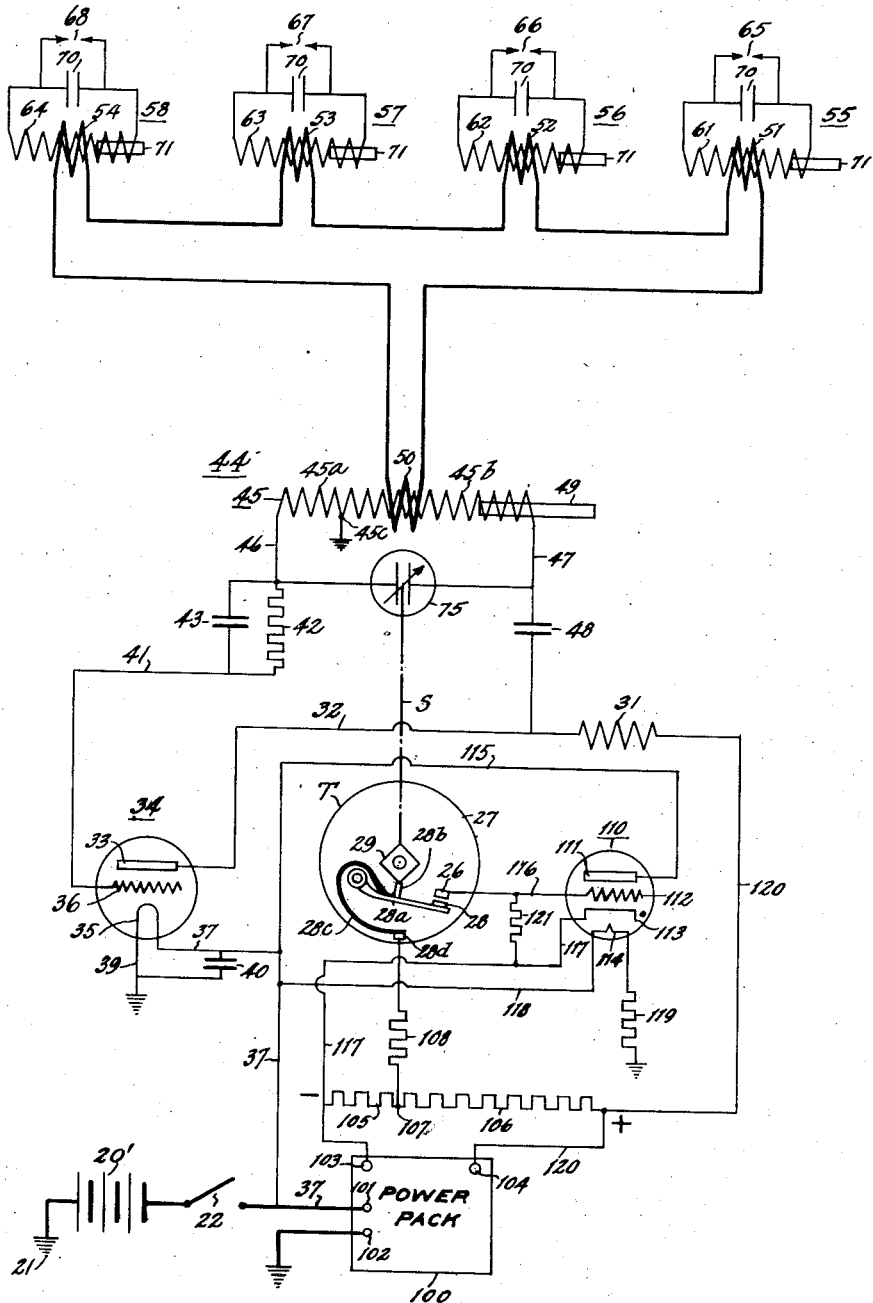
Fig. 2 is a wiring diagram of a modified form in which operation of the oscillator is effected by voltage obtained from a power pack.

The circuit shown in Fig. 2 does not use a timer controlled induction coil for impressing a voltage on the oscillator but uses instead a high voltage source whose voltage is impressed upon the oscillator by a timer controlled thyratron. As shown in Fig. 2, the high voltage source is a power pack or vibrator power supply 100, having high voltage output terminals 103 and 104 having low voltage input terminals 101 and 102 connectible by switch 22 with a relatively low voltage storage battery 20'. As will be understood by those skilled in the art, the power pack 100 provides means for transforming low voltage direct current to high voltage direct current which, for example, may be four thousand volts across the terminals 103 and 104. These terminals are connected with voltage divider resistances 105 and 106 connected with a tap 107. The total resistance of elements 105 and 106 is, for example, 150,000 ohms and the voltage between the tap 107 and terminal 103 is two hundred volts. The tap 107 is connected through a resistance 108, preferably 2500 ohms, with the breaker lever 28a of timer T.

A hydrogen filled thyraton tube 110 provides a plate 111, a grid 112, a cathode 113 and a cathode heater filament 114. Plate 111 is connected with the cathode 35 of tube 34 by wire 115 and wire 37 which is connected with the battery switch 22 and with the power pack terminal 101. The grid 112 is connected by wire 116 with timer contact 26. Cathode 113 is connected by wire 117 with resistance 105 and with power pack terminal 103. Filament 114 is connected by wire 118 with wire 37 and with a resistance 119 of a value suitable for use with the thyratron 110. Wire 120 connects radio frequency choke 31 with resistance 106 and with power pack terminal 104. A resistance 121, preferably 5000 ohms, connects wires 116 and 117.

The operation of the system shown in Fig. 2 is as follows: While contact 28 is separated from contact 26, the thyratron 110 does not pass current and the oscillator is inactive. When contact 28 engages contact 26 the following circuit of the grid 112 is established: Voltage divider 107, resistance 108, contacts 28 and 26, wire 116, grid 112, cathode 113, wire 117. Therefore nearly 200 volts is impressed on the grid 112. This causes the thyratron 110 to become conductive and to impress upon the plate 33 of tube 34 the voltage across the power pack terminals 104, 103 through the following circuit: Terminal 104, wire 120, choke 31, wire 32, plate 33 of tube 34, cathode 35, wire 37, wire 115, plate 111 of thyratron 110, cathode 113, wire 117, power pack terminal 103. This causes the oscillator to become operative whereby oscillations occur in the oscillator coil primary 45 of a frequency depending upon the adjustment of the variable condenser 75 which is controlled in timed relation with the timer cam 29; and ignition will be provided at that spark plug associated with the resonator with which the oscillator is in tune at the instant of engagement of contacts 28 and 26.

The operation of the oscillator is the same in both circuits. In Fig. 1, the oscillator begins to operate when, due to the discharge of energy of the ignition coil 24 following separation of the timer contacts, the cold cathode diode 30 becomes conducting. The oscillator ceases operating in Fig. 1 when the coil is discharged. In Fig. 2, the closing of the contacts causes the oscillator to operate and the opening of the contacts causes it to cease operating. Whenever a sufficient voltage is impressed on the plate 33 of tube 34 either by opening the contacts in Fig. 1 or closing the contacts in Fig. 2, the oscillator tube 34 permits current to flow to charge the condenser 75. In Fig. 2, the condenser charging circuit includes power pack terminal 104, wire 120, choke 31, condenser 48, condenser 75, resistance 42, wire 41, grid 36, cathode 35, wire 37, wire 115, plate 111, cathode 113, wire 117 and power pack terminal 103. During the charge of condenser 75, the voltage impressed on the grid 36 becomes increasingly positive. As grid 36 becomes more positive, tube 34 passes more current and the voltage drop across the tube decreases. As the voltage drop decreases across tube 34, the condenser 75 starts discharging and produces a negative voltage on the grid 36 due to the operation of two inductively related circuits. One of these circuits is condenser 75, wire 47, all of the oscillator primary coil 45 and wire 46; and the other circuit includes the grounded tap 45c of primary 45, the primary section 45a, wire 46, resistance 42, wire 41, grid 36, cathode 35 and ground connection back to 45c. The negative voltage impressed on grid 36 causes less current to flow from the plate 33, thereby raising the voltage drop across the tube 34 and allowing the condenser 75 to be charged again. In this way, an oscillation through the primary 45 is sustained. This oscillation increases rapidly in amplitude until the maximum amplitude is reached; and the oscillation is sustained so long as sufficient voltage is impressed on the plate 33 of oscillator tube 34. In other words, the oscillator tube 34 operates in a manner analogous to a variable resistance in shunt with the condenser 75. As condenser charge increases the variable resistance decreases automatically; and, when the decrease of resistance is such that the condenser is robbed of charging current, the condenser discharges. The discharge of the condenser automatically causes the variable resistance to increase whereby the condenser is permitted to receive a charging current; and the cycle is repeated so long as sufficient voltage is being impressed on the plate 33 of tube 34.

As the current oscillation through the oscillator primary coil 45 increases in magnitude that resonator with which the condenser 75 is tuned will have, in its condenser-coil circuit, a corresponding oscillation increasing in magnitude until voltage impressed upon the spark plug is sufficient to cause the current to jump the gap. As stated before, only the resonator which is in tune with the oscillator receives the benefit of the alternating charge and discharge of the condenser 75.

The ignition unit which comprises the ignition timer and the variable condenser will now be described, with reference to Figs. 3, 4 and 5. A timer housing 130 supports circuit breaker plate 27 which pivotally supports the breaker lever 28a having the rubbing block 28b urged by spring 28c toward the cam 29 driven in any suitable manner by the engine through the shaft S. If the timer has both contacts insulated as shown in Fig. 2, terminal 28d, insulatingly supported by the housing, would be connected with the resistance 108 and with spring 28c. Another terminal (not shown), insulatingly supported by the housing, would be connected with contact 26 and wire 116. According to the circuit shown in Fig. 1, the terminal which is insulatingly supported by the housing and is connected with contact 26 would be connected with primary coil 23 and with the condenser 26a which, as shown in Fig. 3, is secured by a clip 26b and a screw 26c to the breaker plate 27 upon which the condenser 26a is grounded.

To the timer housing 130 there is secured a condenser housing 131 having a wall 132 which separates the timer from the condenser 75 in chamber 133 which is closed by a cover 134 sealed by a gasket 135. Cover 134 is secured to housing 131 by screws 136. The condenser 75 comprises four stationary plates 140 and five movable plates 141. Two of the screws 136 pass through the plates 140 and metal spacer sleeves 142 and metal washers 143. The stationary plates 140 are electrically connected with each other by the spacers and screws and are connected by a strap 144 with a terminal 145.

The movable plates 141 are each provided with an aperture 146 having a flat 147 which engages a similar flat provided by a non-metallic rod 148 which extends through the opening 146 in the plates 141. Rod 148 has an enlarged portion 149 which provides a shoulder 150 against which the plates and intermediate metal spacers 151 are urged by the hex-portion 152 of a screw 153 threaded into a tapped opening in the rod 148. Screw 153 has an extension 154 journaled in a bearing 155 supported by the cover 134. A carbon brush 156 bears against the upper end of the part 154 and receives a spring blade 157 connected with a terminal 158 attached to the cover 134. The rod 148 has an extension 159 passing through a metal sleeve 160 and attached thereto by a cross pin 161. The sleeve 160 is journaled in a bearing 162 provided by wall 132 of housing 131 and is supported vertically thereby, said bearing being engaged at its upper end by a washer 163 which is sprung into a groove 164 provided by the sleeve 160. Sleeve 160 provides a tang 165 which enters a notch 166 provided by cam 29 thereby drivingly connecting the cam 29 with the condenser plates 141 in a predetermined relation.

The condenser plates 140 and 141 are coated with a material (141a in Fig. 5) having high specific inductive capacity. A suitable polymer of this character, such as polystyrene is dissolved in butyl acetate to make a solution about the consistency of new maple syrup. To this is added a nominal amount of silicon resin. The condenser plates are coated by dipping. The plates 140 may be dipped separately or while being maintained in assembly with the spacers 142 by means of short screws and nuts (not shown) in lieu of the screws 136. The plates 141 may be dipped separately but can be dipped when assembled with the spacers 151, rod 148 and screw 153. Each coat is very thin for example, .00025" thick. After dipping, the coated plates are placed for ten minutes in a vacuum chamber at 5" to 7" Hg vacuum. Then the coat is thoroughly dried in air. This process is repeated as many times as necessary to obtain the desired total thickness of .050" to .060", for example. The result is a coating having satisfactory dielectric strength and specific inductive capacity. The condenser plates are made of aluminum and with rounded edges; and they are flattened and polished to a mirror finish before coating.

Fig. 6 shows a unit which includes an assembly of parts of each resonator. The unit comprises a non-conducting body 170 upon which is wound the resonator secondary such as secondary 61 connected at one end with a terminal 171 and at the other end with a conductor 172 connected with a threaded bushing 173 adapted to be screwed on the insulated terminal of a spark plug. Since the spark plug is grounded on the engine, the terminal screw 171 would be connected with ground through the engine frame or cylinder block. The resonator condenser 70 would be connected between the screw 171 and the bushing 173. The non-conducting body 170 is provided with a central bore 174 for receiving the tuning rod 71 shown in Fig. 1. The rod is adjusted relative to the coil 61 by turning a screw 175 attached to the rod 71 and threaded through a bushing 176 screwed into the body 170, the rod 171 being retained in the adjusted position by tightening a lock nut 177. The resonator primary coil, such as coil 51, is merely dropped over the body 170 and located around the secondary coil 61. The oscillator secondary 50 and the several resonator primaries 51, 52, 53 and 54 may be formed of one continuous piece of wire. The spark plug has the capacitance represented by condenser 70.

While the embodiments of the present invention as herein disclosed, constitute preferred forms, it is to be understood that other forms might be adopted, all coming within the scope of the claims which follow.

What is claimed is as follows:

1. In an ignition system for an internal combustion engine having a spark-plug; a timer operated by the engine; an oscillator including a coil and a condenser; a resonator connected with the spark plug and inductively coupled with the oscillator coil; an oscillator control tube responsive to the application of a required voltage for causing operation of the oscillator; and means under control by the timer for effecting the application of the required voltage upon the control tube at the time when ignition is required.

2. An ignition system according to claim 1 in which the control tube is rendered conducting by the application of a required plate voltage whereby the condenser can be charged through its grid-to-cathode circuit, said tube operating in response to increase of condenser charge to increase the voltage drop between its plate and cathode whereupon the condenser discharges through the oscillator coil, a circuit including the tube grid and a portion of the oscillator coil whereby discharge of the condenser through the oscillator coil causes the voltage drop between the plate and cathode to decrease whereupon the charging of the condenser is resumed.

3. An ignition system according to claim 1 in which the means under the control of the timer is an induction coil having a primary winding connected by the timer intermittently with a current source and having a secondary winding connected with the device, a voltage being generated in the secondary winding when the timer operates to disconnect the primary winding from the current source.

4. An ignition system for a multi-cylinder internal combustion engine having a spark plug in each cylinder, a plurality of resonators having different frequencies and connected respectively with the spark plugs, an oscillator, means for inductively coupling the oscillator with the resonators, an oscillator control tube responsive to the application of a required voltage for causing the oscillator to operate, a timer operated by the engine, means under control by the timer for causing the application of the required voltage upon the control tube at the time when ignition is required, and means operated by the engine for adjusting the oscillator for operation, successively in recurrent sequence, at frequencies corresponding to the frequencies of the resonators.

5. An ignition system for a multi-cylinder internal combustion engine having a spark plug in each cylinder, a plurality of resonators having different frequencies and connected respectively with the spark plugs, and each including an induction coil having a secondary winding connected with a spark plug and having a primary winding, an oscillator including an induction coil having a secondary winding connected with the resonator primary windings in series and including a control tube responsive to the application of a required voltage for causing the oscillator to operate, a timer operated by the engine, means under control by the timer for causing the application of the required voltage upon the control tube at the time when ignition is required, and means operated by the engine for adjusting the oscillator for operation, successively, in recurrent sequence, at frequencies corresponding to the frequencies of the resonators.

6. An ignition system for a multi-cylinder internal combustion engine having a spark plug in each cylinder, a plurality of resonators having different frequencies and connected respectively with the spark plugs, an oscillator, means for inductively coupling the oscillator with the resonators, an oscillator control tube responsive to the application of a required voltage for causing the oscillator to operate, a timer operated by the engine, means under control by the timer for causing the application of the required voltage upon the control tube at the time when ignition is required, means operated by the engine for adjusting the oscillator for operation successively in recurrent sequence at different frequencies, and means provided by each resonator for adjusting its frequency to that which the oscillator has at the time when ignition is required at the plug connected with that resonator.

7. An ignition system for a multi-cylinder internal combustion engine having a spark plug in each cylinder, a plurality of resonators having different frequencies and connected respectively with the spark plugs, an oscillator including a coil and a variable condenser having movable plates by which the oscillator can be adjusted for operation, successively in recurrent sequence, at frequencies corresponding to the frequencies of the resonators, means for inductively coupling the oscillator coil with the resonators, an oscillator controller responsive to the application of a required voltage for causing the oscillator to operate, a timer operated by the engine, means under control by the timer for causing the application of the required voltage upon the control tube at the time when ignition is required, and means operated by the engine in synchronism with the timer for moving the movable plates of the variable condenser.

8. An ignition system for an internal combustion engine comprising, a resonator including an induction coil having a primary winding and a secondary winding, the secondary winding being connected with a spark plug; an oscillator in tune with the resonator and including a control tube, a condenser and an induction coil having a primary winding connected with the tube and the condenser and having a secondary winding connected with the primary winding of the resonator; an engine operated timer; and means under control by the timer for impressing such voltage upon the plate of the oscillator tube that the oscillator becomes operative.

9. An ignition system according to claim 8 in which the means under control by the timer includes an induction coil having a secondary winding connected with the oscillator tube plate and having a primary winding connected by the timer with a current source.

10. An ignition system according to claim 3 in which the means under control by the timer includes a thyratron for connecting the oscillator tube plate with a current source, and in which the grid circuit of the thyratron is under control by the timer.

11. An ignition system for an internal combustion engine comprising, a plurality of resonators having different frequencies each including an induction coil having a primary winding and a secondary winding, said secondary windings being connected respectively with spark plugs; an oscillator including a control tube; a variable condenser having a rotatable element and including an induction coil having a primary winding connected with the tube and the condenser and having a secondary winding connected in a series circuit including the primary windings of the resonator induction coils; a timer; means driven by the engine for operating the timer and the rotatable element of the variable condenser in order to tune the oscillator sequentially with the resonators at the times when ignition is required; and means under control by the timer for impressing such voltage upon the plate of the oscillator tube that the oscillator becomes operative.

12. An ignition system according to claim 11 in which the means under control by the timer includes an induction coil having a secondary winding connected with the oscillator tube plate and having a primary winding connected by the timer with a current source.

13. An ignition system according to claim 11 in which the means under the control by the timer includes a thyratron for connecting the oscillator tube plate with a current source, and in which the grid circuit of the thyratron is under the control of the timer.

14. A timer and variable condenser unit for use in an ignition system having a timer-controlled oscillator including a variable condenser by which the oscillator is tuned sequentially to a plurality of resonators inductively associated with the oscillator and respectively connected with spark-plugs, said unit comprising a housing; a circuit make-and-break device in the housing; a variable condenser supported by the housing and having a rotatable element; an engine driven member supported by the housing and operating said device; and means connecting said member with the element.

15. A timer and variable condenser unit for use in an ignition system having a timer-controlled oscillator including a variable condenser by which the oscillator is tuned sequentially to a plurality of resonators inductively associated with the oscillator and respectively connected with spark plugs, said unit comprising a housing; a circuit make-and-break device in the housing; a hollow body supported by the housing; a variable condenser supported within the housing, said condenser having a plurality of spaced apart stationary plates carried by the body and a plurality of rotatable elements disposed in said body in superposed relation and connected in spaced apart relation to one another on a shaft journalled in the body; an engine driven member supported by the housing and operating the device; and means for connecting the member with the shaft.

16. A resonator unit for use in an ignition system having an oscillator which includes an induction coil having primary and secondary windings and which includes a resonator induction coil primary winding connected in series with the secondary winding of the oscillator induction coil, said unit comprising a non-conducting body; a metal terminal supported thereby and providing for attachment of the unit to a spark plug and the electrical connection of the terminal with the insulated electrode of the spark-plug, a grounding terminal carried by the body, a resonator secondary coil surrounding the body and connected with said terminal and the grounding terminal, a magnetizable core supported by the body and surrounded by the secondary; and means for adjusting the core relative to the secondary, said body of the unit providing a support for the resonator primary coil.

17. An ignition system for an internal combustion engine having a plurality of spark plugs, said system comprising a plurality of resonators connected respectively with the spark plugs and each including a transformer having a primary coil and a secondary coil connected with the spark plug electrodes and including a condenser connected with the secondary coil and including an adjustable transformer core, the location of which determines the frequency of the resonator, the resonators being tuned to different frequencies by adjustment of their cores; an oscillator having a transformer comprising a secondary coil connected in series with all of the resonator primary coils in series, and comprising a primary coil, and having a variable condenser including fixed plates and rotary plates connected with the end terminals of the oscillator primary coil, and having a control tube including a plate connected with one terminal of the variable condenser, a grid connected with the other terminal of the variable condenser and including a cathode connected with the oscillator primary coil intermediate its end terminal; a timer including a cam driven by the engine and a pair of engageable contacts one of which is periodically moved from the other by operation of the cam, an engine driven member which rotates the rotary plates of the variable condenser in tuned relation to control of the movable contact by the cam; and apparatus under control of the timer contacts for periodically causing impression upon the plate of the oscillator tube and upon the variable condenser of a voltage required for oscillator operation.

18. An ignition system according to claim 17 in which the apparatus comprises a relatively low voltage current source, an induction coil having a primary winding connectible through the timer contacts with the current source and having a secondary winding, and cold cathode diode tube connecting the secondary winding with the plate of the oscillator control tube, a relatively high voltage being induced in the secondary winding when the timer contacts separate.

19. An ignition system according to claim 17 in which the apparatus comprises a relatively high voltage current source, a thyratron for connecting the current source with the plate of the oscillator tube when the thyratron becomes conducting, a voltage divider connected with the current source, and a circuit including the thyratron grid, the timer contacts and a portion of the voltage divider, whereby closing of the timer contacts renders the thyratron conducting.

BROOKS H. SHORT.

REFERENCES CITED

The following references are of record in the file of this patent:

UNITED STATES PATENTS

| Number | Name | Date |
| --- | --- | --- |
| 2,347,286 | Sandretto | Apr. 25, 1944 |
| 2,389,637 | Ruben | Nov. 27, 1945 |
| 2,409,202 | Francis | Oct. 15, 1946 |